United States Patent
Vincent

(10) Patent No.: US 11,020,696 B2
(45) Date of Patent: Jun. 1, 2021

(54) CERAMIC FOAM FILTER FOR NON-FERROUS METALS

(71) Applicant: PYROTEK ENGINEERING MATERIALS LIMITED, Milton Keynes (GB)

(72) Inventor: Mark Vincent, Leighton Buzzard (GB)

(73) Assignee: PYROTEK ENGINEERING MATERIALS LIMITED

(*) Notice: Subject to any disclaimer, the term of this patent is extended or adjusted under 35 U.S.C. 154(b) by 76 days.

(21) Appl. No.: 16/239,106

(22) Filed: Jan. 3, 2019

(65) Prior Publication Data
US 2019/0240605 A1    Aug. 8, 2019

(30) Foreign Application Priority Data
Jan. 4, 2018    (GB) ...................................... 1800097

(51) Int. Cl.
*C04B 35/634* (2006.01)
*B01D 39/20* (2006.01)
(Continued)

(52) U.S. Cl.
CPC .......... *B01D 39/2093* (2013.01); *C04B 35/10* (2013.01); *C04B 35/111* (2013.01); *C04B 35/634* (2013.01); *C04B 35/6316* (2013.01); *C04B 35/63424* (2013.01); *C04B 38/00* (2013.01); *C04B 38/0615* (2013.01); *C04B 2111/00793* (2013.01); *C04B 2111/00879* (2013.01); *C04B 2235/3217* (2013.01); *C04B 2235/3218* (2013.01); *C04B 2235/3409* (2013.01); *C04B 2235/3418* (2013.01); *C04B 2235/36* (2013.01); *C04B 2235/365* (2013.01); *C04B 2235/77* (2013.01); *C04B 2235/9676* (2013.01)

(58) Field of Classification Search
CPC ...... B22D 41/02; B22D 43/004; C04B 35/10; C04B 5/10; C04B 35/6316; C04B 35/634; B01D 39/2093
See application file for complete search history.

(56) References Cited

U.S. PATENT DOCUMENTS

H000048 H  *  4/1986  Heichel ...................... 210/510.1
4,697,632 A    10/1987  Lirones
(Continued)

FOREIGN PATENT DOCUMENTS

CA       1 059 535       7/1979
CN       101117295 A     2/2008
(Continued)

OTHER PUBLICATIONS

British Search Report dated Jun. 8, 2018 for Application No. GB1800097.6.
(Continued)

Primary Examiner — Scott R Kastler
(74) Attorney, Agent, or Firm — Fay Sharpe LLP

(57) ABSTRACT

A ceramic foam filter for use in filtering non-ferrous metals and manufacturing method for same are disclosed. The ceramic foam filter includes calcined alumina as a core material and silica as a binder. Alternatively, the ceramic foam filter includes calcined alumina as a core material and boric oxide as a binder.

17 Claims, 1 Drawing Sheet

(51) Int. Cl.
*C04B 38/00* (2006.01)
*C04B 35/111* (2006.01)
*C04B 35/10* (2006.01)
*C04B 35/63* (2006.01)
*C04B 38/06* (2006.01)
*C04B 111/00* (2006.01)

(56) References Cited

U.S. PATENT DOCUMENTS

| | | |
|---|---|---|
| 8,518,528 B2 | 8/2013 | Chi et al. |
| 2002/0179523 A1 | 12/2002 | Quackenbush |
| 2019/0240605 A1* | 8/2019 | Vincent .................. C04B 35/634 |

FOREIGN PATENT DOCUMENTS

| | | |
|---|---|---|
| EP | 0 425 833 A1 | 5/1991 |
| WO | WO 2015/173620 A1 | 11/2015 |

OTHER PUBLICATIONS

Extended European Search Report dated Apr. 25, 2019 for Application No. EP 18 21 4071.

* cited by examiner

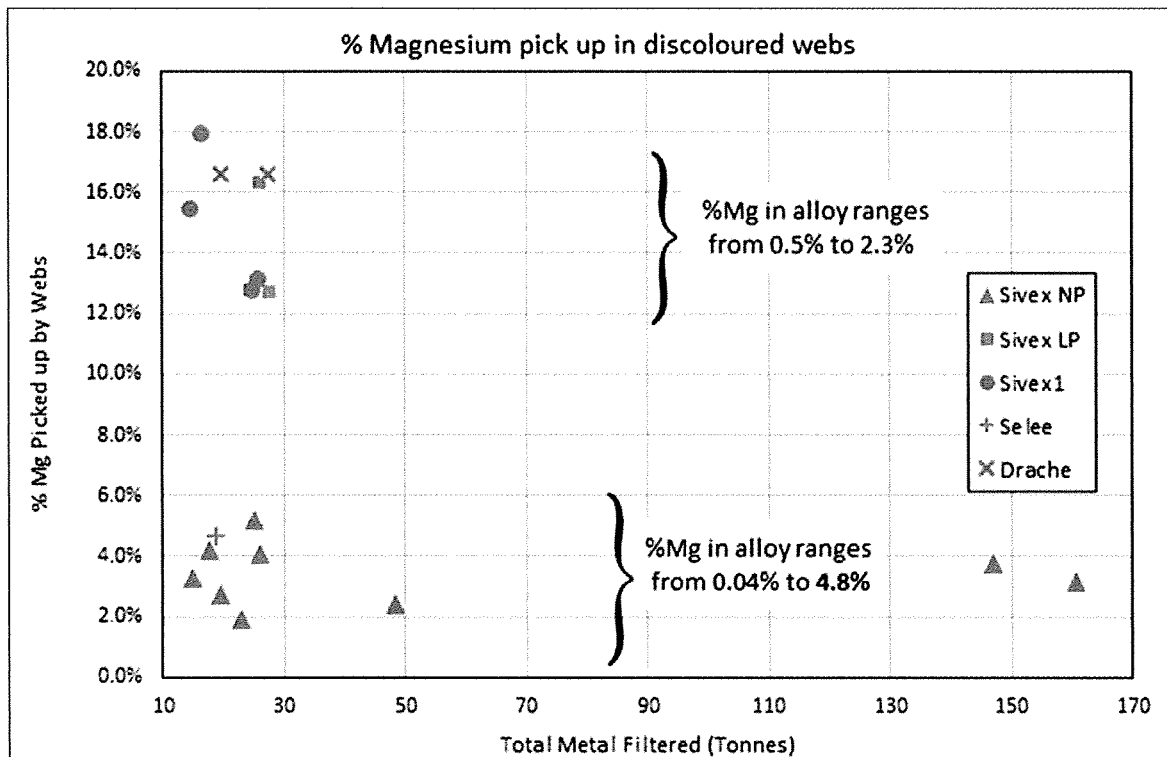

CERAMIC FOAM FILTER FOR NON-FERROUS METALS

CROSS REFERENCE TO RELATED APPLICATION

This application claims foreign priority under 35 USC 119 to British application no. GB1800097.6 filed on Jan. 4, 2018.

FIELD

The present invention relates to a ceramic foam filter for use in the filtration of non-ferrous liquid metals including, for example, aluminium, magnesium, and alloys of each of those metals.

BACKGROUND

The production of ingots and billets of aluminium, magnesium and other non-ferrous metals usually includes a filtration step, in which the liquid metal is passed through a filter to remove inclusions, for example insoluble solid or immiscible liquid impurities. Open pore ceramic foam filters are frequently used for this purpose.

In recent years, the "industry standard" ceramic foam filter has been based primarily on an alumina grain and an aluminium monophosphate binder system. Although such filters have gained widespread acceptance, the formulation has a number of shortcomings, including but not restricted to, poor thermal shock resistance, and higher than desired thermal expansion, fine particle release or "snowing". Another disadvantage associated with phosphate ($P_2O_5$) bonded filters of this general type is the risk of toxic and flammable phosphine gas being released after use, which complicates disposal.

U.S. Pat. No. 8,518,528 describes a ceramic foam filter for molten aluminium alloys, which comprises an alumina silicate rich core, preferably based on Kyanite, and a boron glass shell, which encapsulates the aggregate grain core and protects it from attack by magnesium vapour. The filter does not contain phosphate and does not therefore generate phosphine gas after disposal.

SUMMARY OF THE INVENTION

Although filters of the type described in U.S. Pat. No. 8,518,528 have proved to be commercially successful, there are areas where improved performance would be desirable, including for example the production of less dust during handling of the filter (commonly referred to as "snow"). Also desirable would be an increase in strength measured as cold modulus of rupture (CMOR). An increase in strength allows transportation of the filter to be improved. It also allows the size of the filter to be increased as the additional strength will support the increased filter size and operational needs. Improving the chemical resistance of the filter is another desirable aspect as an improved resistance to attack by magnesium for example (an element found in some Aluminium alloys) can increase the operational life of the filter in some applications.

It is an object of the present invention to provide a ceramic foam filter for non-ferrous metals that meets one or more of the above objectives, without requiring the use of phosphate in the binder material.

According to one aspect of the current invention there is provided a ceramic foam filter for use in filtering non-ferrous metals, comprising calcined alumina as a core material and silica as a binder.

Ceramic foam filters according to the present invention have been shown to produce less snow during use, thus ensuring improved filtration.

Ceramic foam filters according to the present invention have been shown to provide an increased CMOR strength.

Ceramic foam filters according to the present invention have been shown to provide improved resistance to chemical attack, thus providing increased operational life.

In an embodiment the filter has a chemical composition comprising calcined alumina in the range 75-95 wt % and silica in the range 3-15 wt %. Advantageously, the filter has a chemical composition comprising calcined alumina in the range 80-90 wt %. Advantageously, the filter has a chemical composition comprising silica in the range 5-10 wt %.

The ceramic foam filter may have a chemical composition that further comprises borate glass in the range 3-15 wt %, preferably 5-10 wt %.

The ceramic foam filter may have a chemical composition that further comprises boric oxide in the range 0-5 wt %, preferably 0-3 wt %.

The ceramic foam filter may have a density in the range 320-380 kg/m$^3$, preferably 340-360 kg/m$^3$.

According to another aspect of the current invention there is provided a method of manufacturing a ceramic foam filter for use in filtering non-ferrous metals, the method comprising providing a slurry comprising calcined alumina and colloidal silica, coating the slurry onto a foam precursor, drying the slurry-coated foam precursor to form a green state article, and firing the green state article to vaporise the foam precursor, thereby forming a reticulated ceramic foam filter.

In an embodiment the slurry comprises calcined alumina in the range 40-90 wt %, preferably 50-80 wt %, and colloidal silica in the range 5-25 wt %, preferably 10-20 wt %.

In an embodiment the slurry further comprises an organic binder in the range 0-8 wt %, preferably 3-5 wt %. The organic binder may for example be an acrylic-based binder material such as Duramax™ 1000 or another similar ceramic binder product.

In an embodiment the slurry further comprises an inorganic binder, for example borate glass frit, in the range 2-10 wt %, preferably 4-7 wt %.

In an embodiment the slurry further comprises an inorganic binder, for example boric acid, in the range 0-10 wt %, preferably 0-5 wt %.

In an embodiment the slurry further comprises a polymeric binder in the range 0.2-0.8 wt %, preferably 0.3-0.5 wt %. The polymeric binder may for example be PEG (polyethylene glycol).

In an embodiment the slurry further comprises a rheology modifier in the range 0.5-2 wt %, preferably 0.7-1.5 wt %.

In an embodiment the slurry further comprises a dispersant in the range 0-10 wt %, preferably 0.2-10 wt %.

In an embodiment the green state article is fired at a temperature of at least 1000° C., preferably at least 1100° C., more preferably at least 1200° C.

According to another embodiment of the invention there is provided a ceramic foam filter for use in filtering non-ferrous metals, which comprises calcined alumina as a core material and boric oxide as a binder.

BRIEF DESCRIPTION OF THE DRAWING

Embodiments of the invention will now be described, by way of example, with reference to the accompanying FIGURE, wherein:

FIG. 1 is a graph illustrating the percentage magnesium pickup in various ceramic foam filters.

DETAILED DESCRIPTION OF THE INVENTION

The present invention relates to a porous ceramic foam filter, which is suitable for filtering non-ferrous metals, said metals including, for example, aluminium, magnesium and alloys of those metals.

The filter is based primarily on calcined alumina (aluminium oxide, $Al_2O_3$) as a core material and uses silica as a binder, preferably added in the form of colloidal silica. Other binder materials including both organic and inorganic binders may also be used, including for example an organic binder such as Duramax™1000 (an acrylic-based ceramic binder), and inorganic binders such as borate glass frit and boric acid. In addition, the slurry composition from which the filter is manufactured may include one or more additional ingredients selected from a range that includes water, a polymeric binder such as PEG (polyethylene glycol), a rheology modifier such as bentonite, a dispersant and other materials.

The ceramic foam filter of the present invention may be manufactured using conventional ceramic foam precursor techniques. These manufacturing techniques typically include making up an aqueous slurry, coating a foam precursor with the aqueous slurry by impregnating the precursor with the slurry and then squeezing the excess slurry out of the foam precursor, and controlled drying of the coated precursor to remove the liquid phase of the slurry. The drying step develops a rigid "green state" article by use of the organic binder and colloidal silica. The filter is then fired by placing the dried green state article into a kiln, for example a tunnel kiln, and subjecting it to a firing process that may include a number of thermal gradients and time periods. Those firing steps and time periods ensure a number of critical manufacturing steps are met. These include vaporisation of the foam precursor, activation of the inorganic binder or binders, and controlled cooling to minimise thermal shock after peak temperature bonding.

In a typical embodiment, the slurry composition includes the following ingredients by weight:
Binder—Colloidal silica: 5-25%, preferably 10-20%
Polymeric binder—e.g. PEG: 0.2-0.8%, preferably 0.3-0.5%
Organic binder—e.g. Duramax 1000: 0-8%, preferably 3-5%
Rheology modifier—e.g. Bentonite: 0.5-2.0%, preferably 0.7-1.5%
Core material—Calcined alumina: 30-90%, preferably 40-80%
Inorganic binder—Borate glass frit: 2-10%, preferably 4-7%
Inorganic binder—Boric acid 0-10%, preferably 0-5%
Dispersant 0-10%, preferably 0.02-8%
Water 5-20%, preferably 7-15%.

It should be noted however that one or more of these ingredients may be omitted and/or substituted with another ingredient of a similar kind.

The core of the filter is made primarily of calcined alumina ($Al_2O_3$). This core material comprises nearly pure alumina oxide and has excellent resistance to chemical attack by molten aluminium and its alloys. Alumina has been chosen over alternative core materials such as Kyanite, which is a compound and a member of the aluminosilicate family. Such compounds are less resistant to chemical attack by molten aluminium and its alloys. This is thought to be due to the fact that Kyanite contains silicon dioxide, which is attacked and reduced by some aluminium alloys. It is believed that the use of calcined alumina could make the filter material less prone to corrosion from contact with some aluminium alloys.

Calcined alumina particles have porosity. That porosity is very useful as a mechanical anchoring point for the inorganic binder or binders. Those binders use the inter-connecting porosity matrix to provide a mechanical anchoring point. Once the inorganic binders cool and vitrify they become permanently locked into the alumina matrix.

The primary purpose of the colloidal silica binder is to provide strength and support to the filter while it is in a green state and also during the early stages of the firing process, up to a temperature of about 550° C. The use of colloidal silica negates the need for a phosphate based binder.

The borate glass frit acts as a primary inorganic ceramic binder.

Boric acid provides finished fired strength after vitrification. It also acts as a catalyst to the borate glass frit providing more high temperature reactivity. This high temperature reactivity in turn leads to capturing and bonding more calcined alumina particles and reduces the "snowing" effect. During firing, the boric acid degrades and becomes the boric oxide that is present in the final, fired filter. The boric acid may be omitted in certain embodiments of the invention.

The polyethylene glycol (PEG) acts as a polymeric binder and helps to eliminate micro cracking in the ceramic skeleton during drying in the green state.

The Duramax™ 1000 is an acrylic-based organic ceramic binder, which provides enhanced green strength during drying and during the first part of the firing process. Similar acrylic-based organic binders may be substituted this product.

The Bentonite is an absorbent aluminium phyllosilicate clay, which acts as a rheological modifier.

The dispersant may for example be Budit 8H from Chemische Fabrik Budenheim KG

An exemplary composition of the slurry by weight is given below.
Binder—Colloidal silica 13.42%
Polymeric binder—PEG 0.38%
Organic binder—e.g. Duramax 1000 3.8%
Rheology modifier—e.g. Bentonite 0.95%
Core material—Calcined alumina 60.20%
Inorganic binder—Borate glass frit 5.20%
Inorganic binder—Boric acid 5.50%
Dispersant 0.10%
Water 10.45%.

The colloidal silica and the Duramax 1000 each contain about 50 wt % water. The overall water content of the slurry is therefore approximately 19.06 wt % (10.45 wt % as an ingredient, plus 6.71 wt % in the colloidal silica, plus 1.90 wt % in the Duramax 1000). By contrast, the filter described in U.S. Pat. No. 8,518,528 has a water content, in examples 1-3, of between 22.10% and 23.61% (colloidal alumina typically contains about 70% water). The reduced water content in the composition of the filter described herein provides for higher density and reduced porosity in the final filter body. It is believed that the reduced porosity of the final fired body helps to protect the filter against molten aluminium alloy ingress. The reduced water content is also believed to contribute to an increased strength, as demonstrated by an increased cold modulus of rupture (CMOR). The Duramax 1000 and PEG products are also considered to contribute towards the increased strength. The Duramax 1000 is an acrylic-based organic binder that is designed to hold the component parts of the ceramic filter material tightly together in a homogeneous and tightly packed condition during drying and initial firing. The PEG polymeric binder product is designed to eliminate micro cracking during drying.

The Duramax 1000 organic binder and the PEG polymeric binder are also believed to contribute towards a reduction in "snowing" in the finished filter product.

The Duramax 1000 organic binder and the PEG polymeric binder, along with a reduction in the water content of the slurry, are also believed to contribute to an increased crush strength (CS) in the finished filter product.

After drying and firing, the ceramic foam filter typically has the following chemical composition:
Core material—Calcined alumina: 75-95 wt %, preferably 80-90 wt %
Binder—Silica: 3-20 wt %, preferably 5-10 wt %
Binder—Borate glass: 3-15 wt %, preferably 5-10 wt %
Binder—Boric oxide: 0-5 wt %, preferably 0-3 wt %
Rheology modifier—e.g. Bentonite: 0.5-3 wt %, preferably 1-2 wt %.

The results of SEM (scanning electron microscope) analysis to determine the amount of magnesium pickup in various different filters are set out in Table 1 below.

TABLE 1

| Filter | Alloy | Mg (%) | Casting Table Temp ° C. | Total metal filtered (Tonnes) | Total filtration time (Hrs) | % Mg pick up in discoloured webs | % of Webs that are discoloured | Average estimated % Mg pickup |
|---|---|---|---|---|---|---|---|---|
| Drache | 7024 | 1.8 | 682 | 27.5 | 2.4 | 16.6% | 30% | 5.2% |
| Drache | 6082 | 0.7 | 698 | 19.5 | 1.7 | 16.6% | 20% | 3.7% |
| Selee | 5083 | 4.6 | 676 | 18.6 | 1.6 | 4.7% | 70% | 3.7% |
| Sivex LP | 7024 | 1.7 | 682 | 27.7 | 2.4 | 12.7% | 10% | 1.3% |
| Sivex LP | 6082 | 0.65 | | 24.4 | 1.7 | 12.8% | 40% | 5.3% |
| Sivex LP | 7075 | 2.32 | 680 | 26 | 1.8 | 16% | 85% | 13.9% |
| Sivex NP | 5083 | 4.8 | | 22.9 | 2.0 | 1.9% | 40% | 0.8% |
| Sivex NP | 6082 | 0.65 | | 19.5 | 1.7 | 2.7% | 80% | 2.2% |
| Sivex NP | 5052 | 2.48 | 702 | 48.3 | 1.7 | 2.4% | 10% | 0.07% |
| Sivex NP | 3005 | 0.54 | 690 | 15 | 1.3 | 3.3% | 95% | 3.2% |
| Sivex NP | 6062 | 0.92 | 692 | 25 | 1.8 | 5.2% | 100% | 5.2% |
| Sivex NP | 7075 | 2.24 | 680 | 26 | 1.8 | 4.1% | 100% | 4.1% |
| Sivex NP | 5754 | 3.18 | 690 | 18 | 1.8 | 4.2% | 100% | 4.2% |
| Sivex NP | 8011 | 0.07 | 701 | 147 | 25.2 | 3.8% | 100% | 3.8% |
| Sivex NP | 3003 | 0.04 | 701 | 161 | 24.1 | 3.2% | 100% | 3.2% |
| Sivex1 | 6082 | 0.7 | 692 | 16.6 | 1.0 | 17.9% | 30% | 5.6% |
| Sivex1 | 3005 | 0.51 | 693 | 15 | 1.3 | 15.4% | 80% | 12.3% |
| Sivex1 | 6062 | 0.96 | 690 | 25 | 1.8 | 12.7% | 95% | 12.0% |
| Sivex1 | 7075 | 2.35 | 682 | 26 | 1.8 | 13.1% | 50% | 6.8% |

Table 1 shows the weight % quantity of magnesium retained in the filter matrix after casting various different alloys. This is determined by measuring the quantity of magnesium in the discoloured webs of a selection of used filter samples, along with visual estimation of the amount of webs that are discoloured, to calculate an average estimated % magnesium pickup.

The data shows that a filter according to present invention (identified as the "Sivex NP" filter) picked up only a small amount of magnesium (0 to 5%) and a significantly lower amount than all the phosphate bonded filters (identified as "Sivex LP", "Drache" and "Sivex 1"). In addition, the magnesium levels are low in the Sivex NP filter for all alloys tested, including the high magnesium 5083 alloy and the low magnesium 6082, 8011 and 3003 alloys.

A filter of the type described in U.S. Pat. No. 8,518,528 (identified as "Selee") also picked up less magnesium (4.7%) than the phosphate bonded filters, but approximately twice as much as the Sivex NP filter in the same high magnesium 5083 alloy.

The results of the tests to measure the amount of magnesium picked up in the filter described herein, as compared to various other filters, are also set out in the graph shown in FIG. 1.

Benefits associated with the filter described herein ("Sivex NP") as compared to the filter described in U.S. Pat. No. 8,518,528 ("Selee CSX") are set out in Table 2 below.

TABLE 2

| | Sivex NP | Selee CSX |
|---|---|---|
| CMOR (lbf) | 69 | 60 |
| Snowing Filter 23" × 23" × 2" (grams) | 0.30 | 0.62 |
| Magnesium Pickup in 5083 4% Mg alloy | 2% | 5% |

It can be seen that compared to the known Selee CSX filter, the Sivex NP filter, which comprises an embodiment of the invention, has increased CMOR strength, reduced snow and reduced magnesium pick-up.

SEM (Scanning Electron Microscope) analysis shows that the filter material described herein picks up only 0-5% magnesium, despite being used in alloys with vastly different magnesium contents: i.e. 5083 alloy (which contains 4-5% magnesium) and 6082 alloy (which contains 0.7% magnesium). No decrease in silica content of the filter was measured.

By comparison, SEM analysis shows that the phosphate-bonded filter materials pick up much more magnesium in the range of 12-17%, despite not being tested in the 5083 high magnesium content alloy.

Further test results are set out in Table 3 below.

TABLE 3

Typical results for a 23" Grade 30 filter

| | MOR (Lbf) | CS (Lbf) | Snow (g) | Thermal Shock res. (s) | Density |
|---|---|---|---|---|---|
| Pyrotek limit | 44 | 225 | 1.00 | NA | NA |
| Sivex 1 | 81 | 312 | 0.40 | 251 | 342 |
| Sivex 2.0 | 120 | 360 | 0.44 | 228 | 399 |
| Drache HF | 67 | 308 | 0.28 | | 403 |

TABLE 3-continued

Typical results for a 23" Grade 30 filter

|  | MOR (Lbf) | CS (Lbf) | Snow (g) | Thermal Shock res. (s) | Density |
|---|---|---|---|---|---|
| Selee CSX | 60 | 230 |  | 900 | 340 |
| Non-Phos CA 12-1-L | 62 | 245 | 0.30 | 650 | 350 |
| Low-Phos 166 | 89 | 280 | 0.28 | 840 | 346 |

In these tests the filter identified as "Non-Phos CA 12-1-L" comprises a filter according to an embodiment of the invention, and the other filters are all known types. It can be seen that the Non-Phos CA 12-1-L filter meets the required limits for modulus of rupture (MOR) and crush strength (CS), produces very little snow, and has good thermal shock and density characteristics (350 kg/m$^3$).

The invention claimed is:

1. A ceramic foam filter for use in filtering non-ferrous metals, comprising calcined alumina as a core material and silica as a binder, wherein the filter has a chemical composition comprising calcined alumina in the range 75-95 wt %, borate glass in the range 3-15 wt % and silica in the range 3-15 wt %.

2. A ceramic foam filter according to claim 1, wherein the filter has a chemical composition comprising calcined alumina in the range 80-90 wt %, and silica in the range 5-10 wt %.

3. A ceramic foam filter according to claim 1, wherein the filter has a chemical composition that further comprises borate glass in the range 5-10 wt %.

4. A ceramic foam filter according to claim 1, wherein the filter has a chemical composition that further comprises boric oxide in the range 0-5 wt %.

5. A ceramic foam filter according to claim 1, wherein the filter has a chemical composition that further comprises boric oxide in the range 0-3 wt %.

6. A ceramic foam filter according to claim 1, having a density in the range 320-380 kg/m$^3$.

7. A ceramic foam filter according to claim 1, having a density in the range 340-360 kg/m$^3$.

8. A method of manufacturing a ceramic foam filter for use in filtering non-ferrous metals, the ceramic foam filter comprising calcined alumina as a core material and silica as a binder, wherein the filter has a chemical composition comprising calcined alumina in the range 75-95 wt %, borate glass in the range 3-15 wt % and silica in the range 3-15 wt %, the method comprising providing a slurry comprising calcined alumina and colloidal silica, coating the slurry onto a foam precursor, drying the slurry-coated foam precursor to form a green state article, and firing the green state article to vaporise the foam precursor, thereby forming a reticulated ceramic foam filter, wherein the slurry comprises calcined alumina in the range 40-90 wt %, borate glass frit in the range 2-10 wt % and colloidal silica in the range 5-25 wt %.

9. A method according to claim 8, wherein the slurry comprises calcined alumina in the range 50-80 wt %, and colloidal silica in the range 10-20 wt %.

10. A method according to claim 8, wherein the slurry further comprises an acrylic-based organic binder in the range 0-8 wt %.

11. A method according to claim 8, wherein the slurry further comprises an acrylic-based organic binder in the range 3-5 wt %.

12. A method according to claim 8, wherein the slurry further comprises borate glass frit in the range 4-7 wt %.

13. A method according to claim 8, wherein the slurry further comprises boric acid in the range 0-10 wt %.

14. A method according to claim 8, wherein the slurry further comprises a polymeric binder in the range 0.2-0.8 wt %.

15. A method according to claim 8, wherein the slurry further comprises a rheology modifier in the range 0.5-2 wt %.

16. A method according to claim 8, wherein the slurry further comprises a dispersant in the range 0-10 wt %.

17. A method according to claim 8, wherein the green state article is fired at a temperature of at least 1,000° C.

* * * * *